United States Patent
Lin (10) Patent No.: US 12,093,047 B2
(45) Date of Patent: Sep. 17, 2024

(54) OBSTACLE AVOIDANCE METHOD AND APPARATUS, AND WAREHOUSING ROBOT

(71) Applicant: HAI ROBOTICS CO., LTD., Shenzhen (CN)

(72) Inventor: Han Lin, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 531 days.

(21) Appl. No.: 17/377,009

(22) Filed: Jul. 15, 2021

(65) Prior Publication Data

US 2021/0341930 A1     Nov. 4, 2021

Related U.S. Application Data

(63) Continuation of application No. PCT/CN2020/075136, filed on Feb. 13, 2020.

(30) Foreign Application Priority Data

Jan. 16, 2019    (CN) .......................... 201910041517.8
Jan. 16, 2019    (CN) .......................... 201920073568.4

(51) Int. Cl.
    *G05D 1/00*         (2024.01)
    *G06V 20/10*       (2022.01)
    *G06V 20/58*       (2022.01)

(52) U.S. Cl.
    CPC .......... *G05D 1/0214* (2013.01); *G05D 1/0223* (2013.01); *G06V 20/10* (2022.01); *G06V 20/58* (2022.01)

(58) Field of Classification Search
    CPC .. G05D 1/0214; G05D 1/0223; G05D 1/0274; G05D 1/024; G05D 2201/0216; G06V 20/10; G06V 20/58; B65G 1/04

USPC .......................................................... 701/26
See application file for complete search history.

(56) References Cited

U.S. PATENT DOCUMENTS

| | | | | |
|---|---|---|---|---|
| 8,310,353 B2 * | 11/2012 | Hinninger | ............. | B60Q 9/008 340/438 |
| 8,892,253 B2 * | 11/2014 | Park | ..................... | G05D 1/0274 901/1 |
| 9,754,172 B2 * | 9/2017 | Hayakawa | ............. | G06V 20/56 |
| 2006/0058921 A1 * | 3/2006 | Okamoto | ............. | G05D 1/0272 701/25 |

(Continued)

FOREIGN PATENT DOCUMENTS

| | | |
|---|---|---|
| CN | 105739503 A | 7/2016 |
| CN | 106363668 A | 2/2017 |

(Continued)

OTHER PUBLICATIONS

International Search Report of PCT/CN2020/075136.
The first Office Action of the priority CN application.
The second Office Action of the priority CN application.

*Primary Examiner* — Aryan E Weisenfeld
*Assistant Examiner* — Dominick Mulder
(74) *Attorney, Agent, or Firm* — J.C. PATENTS (57) ABSTRACT

An obstacle avoidance method and apparatus, and a warehousing robot. The method includes: obtaining working state information, where the working state information includes a working mode and a working region; determining a detection region according to the working state information; and performing braking if an obstacle exists in the detection region.

16 Claims, 5 Drawing Sheets

(56) References Cited

U.S. PATENT DOCUMENTS

| | | | | |
|---|---|---|---|---|
| 2009/0043440 A1* | 2/2009 | Matsukawa | G05D 1/0238 | 701/25 |
| 2009/0243822 A1* | 10/2009 | Hinninger | B60Q 9/008 | 340/435 |
| 2011/0298579 A1* | 12/2011 | Hardegger | F16P 3/14 | 340/3.1 |
| 2012/0035797 A1* | 2/2012 | Oobayashi | G05D 1/024 | 701/25 |
| 2012/0197439 A1 | 8/2012 | Wang | | |
| 2012/0221207 A1* | 8/2012 | Nakamura | G08G 1/166 | 701/41 |
| 2013/0022246 A1* | 1/2013 | Tayama | G06V 20/588 | 382/104 |
| 2014/0169630 A1* | 6/2014 | Fukata | B60R 1/002 | 382/103 |
| 2017/0285652 A1* | 10/2017 | Shimamura | B60L 50/60 | |
| 2017/0291301 A1 | 10/2017 | Ibarz Gabardos | | |
| 2018/0039267 A1* | 2/2018 | Miyake | B60T 7/12 | |
| 2018/0118202 A1* | 5/2018 | Shimizu | B60T 7/12 | |
| 2018/0333869 A1* | 11/2018 | Ding | B25J 9/0084 | |
| 2021/0072399 A1* | 3/2021 | Ichimura | B60W 30/0956 | |
| 2021/0114620 A1* | 4/2021 | Yu | B60W 30/162 | |
| 2021/0131822 A1* | 5/2021 | Artes | G01C 21/3848 | |
| 2022/0083072 A1* | 3/2022 | Yano | G05D 1/024 | |

FOREIGN PATENT DOCUMENTS

| | | |
|---|---|---|
| CN | 206057969 U | 3/2017 |
| CN | 106843223 A | 6/2017 |
| CN | 107797557 A | 3/2018 |
| CN | 108287544 A | 7/2018 |
| CN | 108363395 A | 8/2018 |
| CN | 109144068 A | 1/2019 |
| CN | 109753070 A | 5/2019 |
| CN | 209522152 U | 10/2019 |
| DE | 102016218738 A1 | 3/2018 |

* cited by examiner

OBSTACLE AVOIDANCE METHOD AND APPARATUS, AND WAREHOUSING ROBOT

CROSS-REFERENCE TO RELATED APPLICATIONS

This application is a continuation of International Application No. PCT/CN2020/075136, filed on Feb. 13, 2020, which claims priority to Chinese Patent Application No. 201920073568.4, filed on Jan. 16, 2019, and Chinese Patent Application No. 201910041517.8, filed on Jan. 16, 2019. All of the aforementioned patent applications are hereby incorporated by reference in their entireties.

TECHNICAL FIELD

The present disclosure relates to the field of obstacle avoidance technologies, and in particular, to an obstacle avoidance method and apparatus, and a warehousing robot.

BACKGROUND

An obstacle avoidance method is an important link in some technical fields of intelligent automation. For example, for an intelligent warehousing robot, unnecessary losses caused by collisions of the warehousing robot during work can be effectively avoided by using the obstacle avoidance method.

In the prior art, due to constraints of an environment or an obstacle avoidance device, most obstacle avoidance methods cannot achieve a good obstacle avoidance effect. For example, most obstacle avoidance methods are realized based on an infrared scanner, but the obstacle avoidance effect is poor due to a fact that infrared rays have poor capability of resisting ambient light interference.

SUMMARY

Embodiments of the present disclosure provide an obstacle avoidance method and apparatus, and a warehousing robot, so as to improve an obstacle avoidance accuracy of the warehousing robot.

In a first aspect, an embodiment of the present disclosure provides an obstacle avoidance method applied to a warehousing robot. The method includes:
  obtaining working state information;
  determining a detection region according to the working state information; and
  performing braking if an obstacle exists in the detection region.

Optionally, the working state information includes a working mode;
  the determining the detection region according to the working state information includes:
  determining the detection region according to the working mode.

Optionally, the determining the detection region according to the working mode includes:
  in a case where the working mode is a linear mode, determining the detection region to be quadrangular;
  in a case where the working mode is a rotation mode, determining the detection region to be circular.

Optionally, the working state information further includes a working region;
  the determining the detection region according to the working state information includes:
  determining the detection region according to the working mode and the working region.

Optionally, the determining the detection region according to the working mode and the working region includes:
  in a case where the working mode is the linear mode and the working region is a second region, determining the detection region to be trapezoidal.

Optionally, the working state information includes a working region;
  the determining the detection region according to the working state information includes:
  determining the detection region according to the working region.

Optionally, the determining the detection region according to the working region includes:
  in a case where the working region is a second region, determining the detection region to be quadrangular; and
  in a case where the working region is a first region, determining the detection region to be quadrangular or circular.

Optionally, the working state information further includes a working mode;
  the determining the detection region according to the working state information includes:
  determining the detection region according to the working region and the working mode.

Optionally, the determining the detection region according to the working region and the working mode includes:
  in a case where the working region is the second region and the working mode is a linear mode, determining the detection region to be trapezoidal;
  in a case where the working region is the first region and the working mode is the linear mode, determining the detection region to be quadrangular;
  in a case where the working region is the first region and the working mode is a rotation mode, determining the detection region to be circular.

Optionally, the determining the detection region according to the working region includes:
  in a case where the working region is a second region, determining the detection region to be trapezoidal.

Optionally, after determining the detection region according to the working state information and before performing the braking if the obstacle exists in the detection region, the method further includes:
  obtaining a current running speed;
  adjusting a range of the detection region dynamically according to the current running speed and a preset speed threshold interval, the range of the detection region corresponding to the speed threshold interval.

In a second aspect, an embodiment of the present disclosure provides an obstacle avoidance apparatus applied to a warehousing robot, where the apparatus includes:
  a first obtaining module, configured to obtain working state information;
  a determining module, configured to determine a detection region according to the working state information; and
  a judging module, configured to perform braking if an obstacle exists in the detection region.

Optionally, the determining module includes:
  a first determining unit, configured to determine the detection region according to a working mode;
  the first determining unit is specifically configured to:
  in a case where the working mode is a linear mode, determine the detection region to be quadrangular;

in a case where the working mode is a rotation mode, determine the detection region to be circular.

Optionally, the determining module includes:
a second determining unit, configured to determine the detection region according to the working mode and a working region;
the second determining unit is specifically configured to:
in a case where the working mode is the linear mode and the working region is a second region, determine the detection region to be trapezoidal.

Optionally, the determining module includes:
a third determining unit, configured to determine the detection region according to the working region.

Optionally, the third determining unit is specifically configured to:
in a case where the working region is the second region, determine the detection region to be quadrangular; or in the case where the working region is the second region, determine the detection region to be trapezoidal;
in a case where the working region is a first region, determine the detection region to be quadrangular or circular.

Optionally, the determining module includes:
a fourth determining unit, configured to determine the detection region according to the working region and the working mode;
the fourth determining unit is specifically configured to:
in a case where the working region is the second region and the working mode is the linear mode, determine the detection region to be trapezoidal;
in a case where the working region is the first region and the working mode is the linear mode, determine the detection region to be quadrangular;
in a case where the working region is the first region and the working mode is the rotation mode, determine the detection region to be circular.

Optionally, the third determining unit is specifically configured to:
in a case where the working region is the second region, determine the detection region to be trapezoidal.

Optionally, the apparatus further includes:
a second obtaining module, configured to obtain a current running speed;
an adjusting module, configured to adjust a range of the detection region dynamically according to the current running speed and a preset speed threshold interval, the range of the detection region corresponding to the speed threshold interval.

In a third aspect, an embodiment of the present disclosure provides a warehousing robot. The warehousing robot includes:
at least one processor; and
a memory communicatively connected to the at least one processor; where,
the memory stores instructions that are executable by the at least one processor, and the instructions are executed by the at least one processor to enable the at least one processor to execute the obstacle avoidance method described above.

In a fourth aspect, an embodiment of the present disclosure provides a storage medium. The storage medium stores executable instructions. When the executable instructions are executed by an intelligent terminal, the intelligent terminal executes the obstacle avoidance method described above.

In a fifth aspect, an embodiment of the present disclosure also provides a program product. The program product includes a program stored on a storage medium, and the program includes program instructions. When the program instructions are executed by an intelligent terminal, the intelligent terminal executes the obstacle avoidance method described above.

The beneficial effects of the embodiments of the present disclosure are that, using the obstacle avoidance method and apparatus, and the warehousing robot provided by the embodiments, the working state information is obtained; the detection region is determined according to the working state information, where the working state information includes the working mode and/or the working region; and if the obstacle exists in the detection region, the braking is performed. In the embodiments of the present disclosure, different manners are provided to determine the detection region according to different working regions and/or different working modes of the warehousing robot, and when the obstacle exists in the detection region, the braking is performed, so as to improve a success rate of obstacle avoidance with a relatively low operation cost.

BRIEF DESCRIPTION OF DRAWINGS

One or more embodiments are exemplarily described by pictures in the drawings corresponding thereto. These exemplary descriptions do not constitute a limitation on the embodiment(s). Elements having the same reference numeral in the drawings represent like elements. Unless otherwise specified, the figures in the drawings do not constitute limitations in scale.

DESCRIPTION OF EMBODIMENTS

In order to make the objectives, technical solutions, and advantages of the present disclosure more clearly understood, the present disclosure will be further described in detail with reference to the accompanying drawings and the embodiments. It will be understood that the specific embodiments described herein are only used to explain the present disclosure, but not used to limit the present disclosure. Based on the embodiments of the present disclosure, all other embodiments obtained by a person of ordinary skill in the art without creative efforts shall fall within the protection scope of the present disclosure.

It should be noted that, various features in the embodiments of the present disclosure may be combined with each other if no conflict exists, which all fall within the protection scope of the present disclosure. In addition, although functional module division is performed in the apparatus schematic diagrams, and logical sequences are shown in the flowcharts, in some cases, steps shown or described may be performed in a way different from the module division in the apparatus, or in a way different from the orders in the flowcharts. Moreover, the words such as "first", "second", and "third" used in the present disclosure do not limit data and execution orders, but only distinguish the same or similar items with substantially the same function and role. When an element is described as being "fixed to" another element, it may be directly on the another element, or one or more intervening elements may exist therebetween. When an element is described as being "connected to" another element, it may be directly connected to the another element, or one or more intervening elements may exist therebetween. The terms "vertical", "horizontal", "left", "right", "inner", "outer" and similar expressions used in this specification are only for descriptive purposes.

Figure 1:
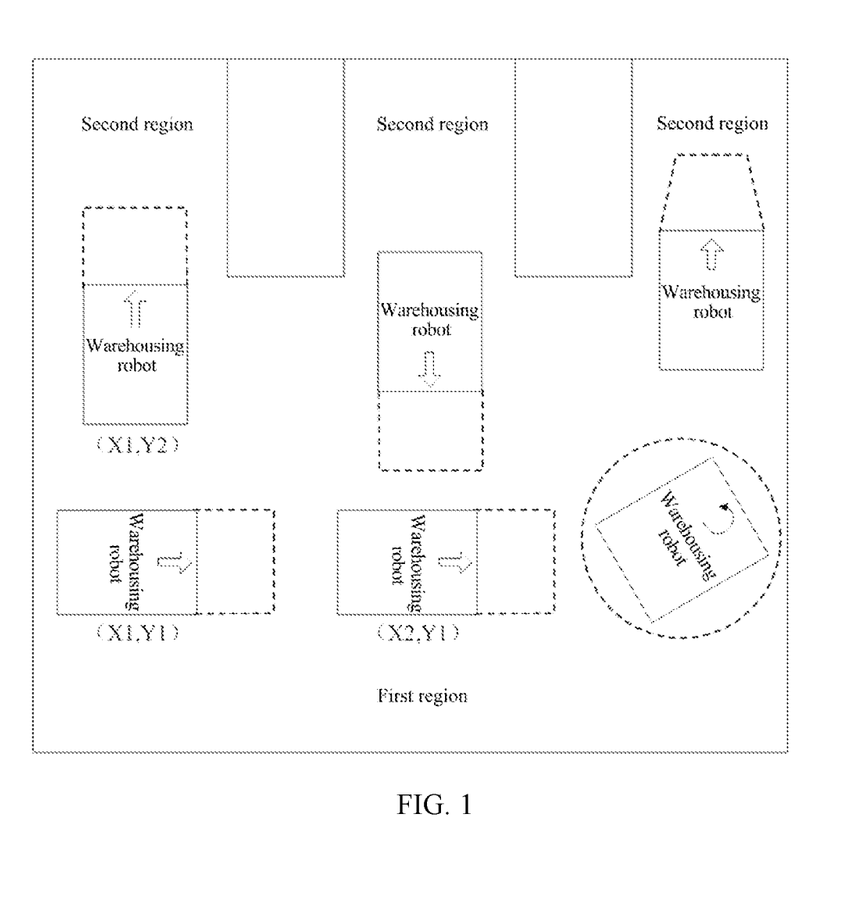
FIG. 1 is a schematic diagram of one of application environments of an obstacle avoidance method in accordance with an embodiment of the present disclosure.

An obstacle avoidance method and apparatus, and a warehousing robot 2 provided by the embodiments of the present disclosure are suitable for the application scenario shown in FIG. 1. The application scenario shown in FIG. 1 is a working region of the warehousing robot 2, including a first region, a second region, and at least one warehousing robot 2. The first region is a region with larger activity area. For example, the first region may be a public region where a plurality of warehousing robots 2 act at the same time. The second region is a region with smaller activity area. For example, the second region is an aisle region between a plurality of shelves placed at intervals. The first region is the public region without shelves and other obstacles. The at least one warehousing robot 2 communicates with a main server while working. The warehousing robot 2 needs to walk in various directions when fetching and placing materials. For example, when the warehousing robot 2 needs to move from the first region to a target position in one of the second regions, the warehousing robot 2 needs to do a rotational motion before entering the second region to adjust a forward direction to be parallel to the second region, and advance towards the target position in a linear motion manner.

It should be noted that a moving trajectory of the warehousing robot 2 may be allocated according to task conditions, and may also be temporarily changed in some cases. The warehousing robots 2 are all controlled by a server. The server is provided with a working path of the warehousing robot 2, and the server dispenses target position information corresponding to position information of the warehousing robot 2. The warehousing robot 2 reports its own position information. The server sends the target position information to the warehousing robot 2 according to the position information reported by the warehousing robot 2, and the warehousing robot 2 moves after receiving the target position information.

The warehousing robot 2 may encounter a shelf foot, a pedestrian or other obstacle in a motion path during working, and the warehousing robot 2 collides with the obstacle, resulting in damage to the warehousing robot 2 and other unnecessary losses. The embodiments of the present disclosure provide an obstacle avoidance method and apparatus, and a warehousing robot. A detection region is provided on the moving trajectory of the warehousing robot 2, and different working modes and different regions correspond to different ranges and shapes of the detection region. When an obstacle appears in the detection region, the warehousing robot 2 is braked, so as to prevent the warehousing robot 2 from colliding with the obstacle.

The above exemplarily shows a form of the application scenario. In other application scenarios, the warehousing robot 2, the number of the second region, the number of the first region, and the region distribution may be set according to actual application situations.

Figure 2:
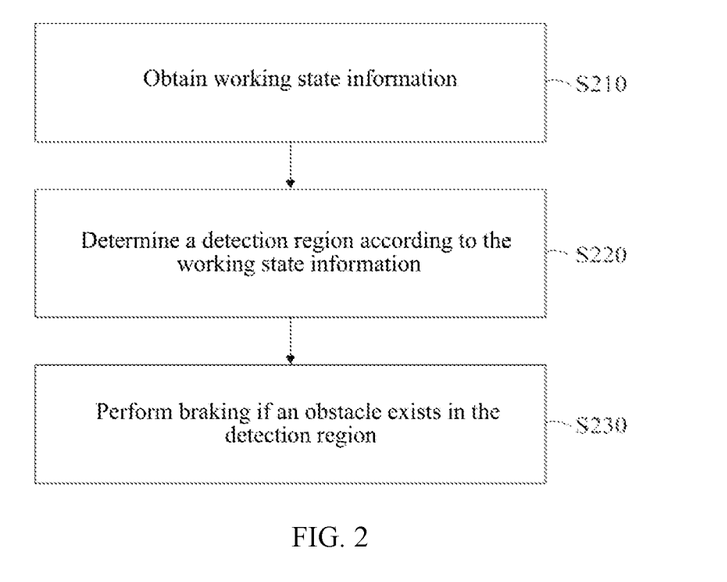
FIG. 2 is a schematic flowchart of an obstacle avoidance method in accordance with an embodiment of the present disclosure.

FIG. 2 is a flowchart of an embodiment of an obstacle avoidance method in accordance with an embodiment of the present disclosure. The obstacle avoidance method can be executed by the warehousing robot 2 in FIG. 1. As shown in FIG. 2, the obstacle avoidance method includes S210 to S230.

S210, obtain working state information.

In this embodiment, a map of the working region is preset in the server. Each physical facility within the working region corresponds to coordinates. The working region of the warehousing robot is divided into the first region(s) and the second region(s). Coordinates of physical facilities correspond to areas of the first region and/or the second region in the working region, for example, the first region and/or the second region are determined by the coordinates of the physical facilities. The entire working region is converted into coordinate information in an equal proportion according to sizes of the regions and stored in the server. All coordinates are also divided into being in the second region(s) and the first region(s) in an equal proportion according to the actual working region, so as to judge which region and specific position of the working region the robot is located in according to the position information sent by the warehousing robot 2 in real time. The position information refers to coordinate information corresponding to the current position of the warehousing robot 2 in the coordinates of a preset working region of the server.

The working state information includes a working mode and/or a working region. The working mode indicates whether the warehousing robot 2 walks straight or rotates. The working region indicates whether the warehousing robot 2 operates in the first region or the second region.

Obtaining of the current position information may be as follows.

Preset two-dimensional codes in the working region are distributed in a uniform array on floors of the first region and the second region. A two-dimensional code includes accurate position information on a region map of a warehouse where it is located, and the position information corresponds to the preset coordinates in the server. That is, the position information of the current position in the two-dimensional code is set according to the preset coordinate map in the server. For example, the warehousing robot 2 is provided with a two-dimensional code scanning and positioning apparatus, which is used for scanning the two-dimensional code to obtain two-dimensional code information. The positioning apparatus is disposed in an exact center of a base of the warehousing robot 2 with a scanning direction directly facing a floor region. After the warehousing robot 2 scans the current two-dimensional code information, the position information in the two-dimensional code information is obtained and reported to the server. During walking, the current position information of the warehousing robot 2 can be obtained through the preset two-dimensional codes on the floors. It should be noted that how to obtain the current position information of the warehousing robot 2 is not a focus of the present disclosure.

Specifically, a confirmation of the working region is a division for the first region and the second region according to the coordinates on the preset map in the server. That is, a part of the coordinates on the preset map in the server correspond to the first region(s), and a part of the coordinates correspond to the second region(s). The specific division is performed in one-to-one correspondence based on relative positional relationship between the first region(s) and the second region(s) in an actual situation. If the coordinates on the preset map in the server corresponding to the current position information belong to the first region, the current working region of the warehousing robot 2 is the first region. If the coordinates on the map corresponding to the current position information belong to the second region, the current working region is the second region.

The warehousing robot may also confirm the working mode through the position information. The working mode includes a linear mode and a rotation mode. The linear mode indicates that the warehousing robot 2 performs linear motion, and the rotation mode indicates that the warehousing robot 2 performs rotation motion according to its own central axis, thereby adjusting a motion direction of the warehousing robot 2. That is, the working mode refers to actions in the first region and the second region. Further, the warehousing robot may obtain the current working mode according to the current position information and next position information sent by the server. For example, as shown in FIG. 1, the forward direction of the warehousing robot is an X-axis direction of preset coordinates, and the position information of the current position is coordinates (X1, Y1). When position information of a target position is coordinates (X1, Y2), the warehousing robot needs to rotate a certain angle to reach the target position, and the current working mode is determined as the rotation mode. When the position information of the target position is (X2, Y1), the current working mode is determined as the linear mode.

Specifically, it is also possible that the server directly sends a corresponding working mode to the warehousing robot. The server obtains the current position information of the warehousing robot 2, meanwhile obtains, according to the current position information and the next position information, a working mode of the warehousing robot 2 from the current position information to the next position information, and returns the working mode to the warehousing robot 2. The warehousing robot 2 directly acts according to the working mode sent by the server.

It should be noted that in the first region, the warehousing robot 2 may perform two working modes, i.e., the linear mode and the rotation mode. In the second region, only the linear mode may be performed without providing the rotation mode in the second region due to the limitation of the shelves, or both the linear mode and the rotation mode may be set to be realized in the second region. The linear mode may include forward and backward motions. The rotation mode may include a clockwise rotation and a counterclockwise rotation.

S220, determine a detection region according to the working state information.

In this embodiment, the working mode includes a linear working mode and a rotation working mode. When obtaining the current working mode and/or working region, the warehousing robot 2 can determine what detection mode should be adopted, where the detection mode is a preset detection manner. In other words, the warehousing robot 2 adopts a corresponding detection manner to judge whether an obstacle exists according to its current position and/or action.

Further, the working mode of the warehousing robot 2 may be obtained first to confirm the detection region for a first time, and then the working region of the warehousing robot 2 may be obtained to further confirm the detection region for a second time. It is also possible to obtain the working region of the warehousing robot 2 first to confirm the detection region for the first time, and then to obtain the working mode of the warehousing robot 2 to further confirm the detection region for the second time.

Specifically, the detection region may be quadrangular or circular, and different working modes and/or different working regions correspond to the detection region of different shapes. For example, the detection region corresponding to the rotation mode is circular, and the detection region corresponding to the linear mode is quadrangular. It should be noted that, as shown in the plurality of warehousing robots 1 in FIG. 1, the detection region may be provided in the forward direction, a backward direction of the warehousing robot, or around the warehousing robot. For example, when the warehousing robot is moving forward, the detection region is in the forward direction of the warehousing robot. When the warehousing robot is moving backward, the detection region is in the backward direction. When the warehousing robot is rotating, the detection region is around the warehousing robot. A purpose of providing the detection region is to avoid collision, personal injury and the like when people or other objects appear in the detection region.

It should be noted that the detection region may be a region where the warehousing robot 2 projects rays through a lidar, for example, into a rectangular, isosceles trapezoidal or circular region. The lidar emits rays within a target range, and if an obstacle exists, the lidar will receive reflected rays reflected from the obstacle. It can be known whether an obstacle appears in the target range by comparing data of the emitted rays and data of the reflected rays. If the emitted rays and the reflected rays are properly processed, various data such as a target distance, an azimuth, a height, a speed, an attitude, and a shape may be obtained.

S230, perform braking if an obstacle exists in the detection region.

In this embodiment, when it is detected that the obstacle appears in the detection region, a braking instruction is sent to a driving system of the warehousing robot 2 immediately, so as to control the warehousing robot 2 to perform a braking action. If no obstacle appears in the detection region, the warehousing robot 2 continues working according to instructions of the driving system.

It should be noted that, when a duration in which the warehousing robot 2 is braked at a certain coordinate position exceeds a preset time threshold, the warehousing robot 2 or the server may send an early warning message to notify a worker to remove the obstacle. After the obstacle is removed, the warehousing robot 2 passes by following an original path, or a path is reallocated to the current warehousing robot 2.

In the obstacle avoidance method provided in this embodiment, the working state information is obtained; the detection region is determined according to the working state information; and if the obstacle exists in the detection region, the braking is performed. The working state information in the embodiment of the present disclosure may be the working region and/or different working modes, so that the warehousing robot 2 working in different regions applies different detection regions, which improves an adaptability of the obstacle avoidance, thereby improving a success rate of obstacle avoidance with a relatively low operation cost.

Embodiment 2 is an obstacle avoidance method provided by another embodiment of the present application. The method can be executed by the warehousing robot 2 in FIG. 1.

The working state information includes the working mode.

The determining the detection region according to the working state information includes:
  determining the detection region according to the working mode.

In this embodiment, after obtaining the working mode, the warehousing robot 2 determines a shape of the detection region according to the working mode. Moreover, different working modes correspond to different shapes of the detection region. It should be noted that the rotation mode may be selectively set in the second region of the working region, resulting in different determination manners of the detection region. Specifically, the different determination manners include:
  setting the rotation mode in the second region, determining the detection region through the working mode, and further determining the detection region through the working region;
  not setting the rotation mode in the second region, and directly determining the detection region through the working region.

It should be noted that whether to set the rotation mode in the second region or not may be adaptively selected according to the area size of the second region and a footprint of the warehousing robot, or according to a user's personal habits or working needs.

Specifically, the determining the detection region according to the working mode includes:
  in a case where the working mode is the linear mode, determining the detection region to be quadrangular;
  in a case where the working mode is the rotation mode, determining the detection region to be circular.

It should be noted that a quadrangle includes a regular shape such as a rectangle, a trapezoid, or a parallelogram. Further, in the case where the working mode is the linear mode, and the detection region is in a shape of quadrangle, the quadrangle is seamlessly docked with a body of the warehousing robot 2, and is located in the forward direction or the backward direction of the warehousing robot 2. A length of a side of the quadrangle docked with the body of the warehousing robot 2 may be not less than a lateral width of the warehousing robot. For example, when the quadrangle is in a shape of trapezoid, a lower bottom of the trapezoid is docked with a side, in the forward direction, of the base of the warehousing robot 2, then the lower bottom of the trapezoid is not less than the length of the side of the base in the forward direction, the purpose of which is to avoid a missed detection due to a fact that the detection region does not cover the path of the warehousing robot 2 in the forward direction. When the detection shape is circular, a radius of the detection region is greater than a rotation radius of the warehousing robot 2, so as to ensure that the warehousing robot 2 does not collide with an obstacle when doing the rotation motion.

In this embodiment, the working state information further includes the working region in addition to the working mode;
  the determining the detection region according to the working state information includes:
    determining the detection region according to the working mode and the working region.

The determining the detection region according to the working mode and the working region may be:
  in a case where the working mode is the linear mode and the working region is the second region, determining the detection region to be trapezoidal.

It should be noted that in the case where the working mode is the linear mode in the second region, the detection region is set to be trapezoidal, which can avoid a shaking of the detection region caused by a shaking of the warehousing robot 2 during walking, leading to a misjudgment caused by the shelf feet entering the detection region due to the shaking of the detection region.

The determining the detection region according to the working mode and the working region further includes:
  in a case where the working mode is the rotation mode and the working region is the second region, determining the detection region to be circular;
  in a case where the working mode is the linear mode and the working region is the first region, determining the detection region to be quadrangular;
  in a case where the working mode is the rotation mode and the working region is the first region, determining the detection region to be circular.

It should be noted that in the case where the working mode is the linear mode and the working region is the first region, the detection region is of which specific kind of quadrangle can be further determined. For example, the quadrangular detection region in the first region is preset to rectangular, and then in the case where the working mode is the linear mode and the working region is the first region, the detection region is determined to rectangular. The shape of the specific quadrangle may be selected according to different needs.

In the obstacle avoidance method provided by this embodiment, the working state information is obtained; the detection region is determined according to the working state information, where the working state information includes the working mode and the working region; and if the obstacle exists in the detection region, the braking is performed. In the embodiment of the present disclosure, different manners are provided to determine the detection region according to different working regions and/or different working modes of the warehousing robot, and when the obstacle exists in the detection region, the braking is performed, so as to improve the success rate of obstacle avoidance with the relatively low operation cost.

Embodiment 3 is an obstacle avoidance method provided by yet another embodiment of the present application. The method can be executed by the warehousing robot 2 in FIG. 1.

The working state information includes the working region.

The determining the detection region according to the working state information includes:
  determining the detection region according to the working region.

In this embodiment, the rotation motion cannot be performed in the second region. That is, only the linear mode is performed in the second region. After obtaining the working region, the warehousing robot 2 determines the detection region according to the working region. Specifically, the determining the detection region according to the working region includes:
  in a case where the working region is the second region, determining the detection region to be quadrangular;

in a case where the working region is the first region, determining the detection region to be quadrangular or circular.

In this embodiment, the working state information may further include the working mode. After the shape of the detection region is determined according to the working region, the detection region may be further determined through the working mode. The determining the detection region according to the working mode and the working region includes:

in a case where the working region is the second region and the working mode is the linear mode, determining the detection region to be trapezoidal;

in a case where the working region is the first region and the working mode is the linear mode, determining the detection region to be quadrangular;

in a case where the working region is the first region and the working mode is the rotation mode, determining the detection region to be circular.

It should be noted that in the case where the working mode is the linear mode and the working region is the first region, the detection region is of which specific kind of quadrangle can be further determined. For example, the quadrangular detection region in the first region is preset to be rectangular, and then in the case where the working mode is the linear mode and the working region is the first region, the detection region is determined to be rectangular. The shape of the specific quadrangle may be selected according to different needs.

In the obstacle avoidance method provided by this embodiment, the working state information is obtained; the detection region is determined according to the working state information, where the working state information includes the working mode and the working region; and if the obstacle exists in the detection region, the braking is performed. In the embodiment of the present disclosure, different manners are provided to determine the detection region according to different working regions and/or different working modes of the warehousing robot, and when the obstacle exists in the detection region, the braking is performed, so as to improve the success rate of obstacle avoidance with the relatively low operation cost.

Embodiment 4 is an obstacle avoidance method provided by yet another embodiment of the present application. The method can be executed by the warehousing robot 2 in FIG. 1.

The determining the detection region according to the working region includes:

in a case where the working region is the second region, determining the detection region to be trapezoidal. This embodiment is a preferred embodiment based on the above embodiment of determining the detection region according to the working region. When the warehousing robot obtains that the working region is the second region, the detection region is directly determined to be trapezoidal. Other technical features are the same as the above embodiment of determining the detection region according to the working region.

For example, the determination of other detection regions may be:

in a case where the working region is the first region and the working mode is the linear mode, determining the detection region to be rectangular; in a case where the working region is the first region and the working mode is the rotation mode, determining the detection region to be circular.

It should be noted that since the warehousing robot 2 has a relatively small range for activity in the second region, some furnishings such as shelves may exist in the second region. In the case where the working mode is the linear mode in the second region, the detection region is set to be trapezoidal, which can avoid the shaking of the detection region caused by the shaking of the warehousing robot 2 during walking, leading to the misjudgment caused by supporting legs of furnishings like the shelf feet entering the detection region due to the shaking of the detection region.

In the obstacle avoidance method provided by this embodiment, the working state information is obtained; the detection region is determined according to the working state information, where the working state information includes the working mode and the working region; and if the obstacle exists in the detection region, the braking is performed. In the embodiment of the present disclosure, different manners are provided to determine the detection region according to different working regions and/or different working modes of the warehousing robot, and when the obstacle exists in the detection region, the braking is performed, so as to improve the success rate of obstacle avoidance with the relatively low operation cost.

Figure 3:
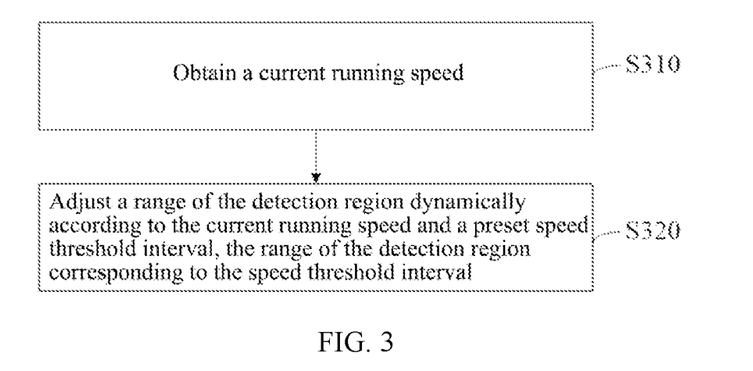
FIG. 3 is a schematic flowchart of an obstacle avoidance method in accordance with an embodiment of the present disclosure.

Embodiment 5 is an obstacle avoidance method provided by yet another embodiment of the present application, as shown in FIG. 3. The method can be executed by the warehousing robot 2 in FIG. 1.

After the detection region is determined according to the working state information, and before the braking is performed if the obstacle exists in the detection region, the method further includes S310 and S320.

S310, obtain a current running speed.

Specifically, the running speed refers to a running speed of the warehousing robot 2 in a case where the working mode is the linear mode. In a case where the working mode is the rotation mode, an angular speed of rotation of the warehousing robot 2 may be set to be constant. The motion of the warehousing robot 2 is realized by working of a motor, and the running speed is obtained by a driver of the motor. The running speed obtained by the driver of the motor is relatively accurate, so that the obstacle avoidance accuracy is relatively high. In another embodiment, the running speed may also be obtained through an external velocity meter or through calculation according to previous and present coordinate information and running time of the warehousing robot 2.

In other embodiments, in a case where the working mode is the rotation mode, the angular speed of the rotation of the warehousing robot 2 may also be set to be variable.

S320, adjust a range of the detection region dynamically according to the current running speed and a preset speed threshold interval, the range of the detection region corresponding to the speed threshold interval.

Specifically, when the warehousing robot 2 performs the rotation motion, the shape of the detection region is circular. In this case, the warehousing robot 2 has no change in position, but only performs the rotation motion in situ. In this case, a value of the running speed is 0. When the value of the running speed is 0, a radius slightly greater than the rotation radius of the warehousing robot 2 is set to achieve effective obstacle avoidance. A specific value of the radius may be set by itself based on a size of the body of the warehousing robot 2.

When the warehousing robot 2 performs the linear motion, the shape of the detection region in this case is rectangular or isosceles trapezoidal. The detection region in this case is provided in the moving direction of the warehousing robot 2, for example, is located at a front end of the robot when moving forward, and is located at a back end of the robot when moving backward. In this case, the running speed of the warehousing robot 2 is not 0. The area size of the detection region is adjusted according to a magnitude of the running speed. For example, when the detection region is in a shape of rectangle, a side of the rectangle (whose length corresponds to the width of the rectangle) coincides with a side of the base (whose length corresponds to the width of the base), and the higher the running speed, the greater the length of the rectangle, and the greater the area of the detection region.

It should be noted that when the running speed of the warehousing robot 2 increases, since a deceleration of the warehousing robot 2 is a constant value (that is, a duration when the warehousing robot 2 decelerates to 0 increases with the increase of the running speed), a braking distance of the warehousing robot 2 also increases with the increase of the running speed, and thus the area of the detection region also increases with the increase of the running speed.

Specifically, the braking distance of the warehousing robot 2 from motion to stop may be calculated according to the deceleration of the warehousing robot 2, and a safe distance for braking when an obstacle is detected may be estimated according to the size of the warehousing robot 2 itself, so as to ensure that collision with the obstacle, which causes unnecessary losses, is not generated when the braking is performed as soon as the obstacle appears in the detection region. It should be noted that in the case where the working mode is the rotation mode, the warehousing robot 2 is in a stagnant state, and thus its speed is 0, and no braking distance exists. In this case, the shape of the detection region is circular. After a rotation diameter of the warehousing robot 2 is calculated, an appropriate speed and a diameter of the detection region slightly greater than the rotation diameter of the warehousing robot 2 may be preset, so as to ensure that the warehousing robot 2 does not collide with the obstacle when rotating.

Optionally, an example where a chassis of the warehousing robot 2 has a length of 1300 mm, a width of 900 mm, a rotation diameter of 1581 mm, and a maximum deceleration of 1.2 m/s*s, is shown in the following table.

| Speed (m/s) | Time (s) | Braking distance (m) | Rotation diameter (m) |
|---|---|---|---|
| 0 | 0 | 0 | 1.581 |
| 0.25 | 0.2083 | 0.0260 | 0 |
| 0.5 | 0.4167 | 0.1042 | 0 |
| 1.0 | 0.8333 | 0.4166 | 0 |
| 1.5 | 1.2500 | 0.9375 | 0 |
| 2.0 | 1.6667 | 1.6667 | 0 |

According to parameters in the above table, a corresponding speed threshold interval and a safe rotation diameter or a safe braking distance corresponding to the speed threshold interval may be preset.

Specifically, the speed threshold interval includes six interval ranges, i.e., [0], (0, 0.25], (0.25, 0.5], (0.5, 1.0], (1.0, 1.5], (1.5, 2.0].

The safe rotation diameter corresponding to the speed threshold interval [0] is 1.7 m. The safe braking distances corresponding to the speed threshold intervals (0, 0.25], (0.25, 0.5], (0.5, 1.0], (1.0, 1.5], (1.5, 2.0] are 0.1 m, 0.2 m, 0.5 m, 1 m, and 1.8 m, respectively.

Further, a corresponding range of the detection region may be calculated according to the detection mode and the speed threshold interval. An exemplary description is as follows.

In the case where the working mode is the rotation mode and the corresponding running speed is 0, the corresponding speed threshold interval is [0], and the safe rotation diameter is 1.7 m. In this case, the area of the detection region is $(1.7/2)*\pi$, which is approximately 2.270 square meters.

In the case where the working mode is the linear mode and the shape of the corresponding detection region is rectangular, the area of the detection region corresponding to the five speed threshold intervals is as follows:
in a case where the speed threshold interval is (0, 0.25], the safe braking distance is 0.1 m, and in this case, the area of the detection region is 0.9 m*0.1 m=0.09 $m^2$;
in a case where the speed threshold interval is (0.25, 0.5], the safe braking distance is 0.2 m, and in this case, the area of the detection region is 0.9 m*0.2 m=0.18 $m^2$;
in a case where the speed threshold interval is (0.5, 1.0], the safe braking distance is 0.5 m, and in this case, the area of the detection region is 0.9 m*0.5 m=0.45 $m^2$;
in a case where the speed threshold interval is (1.0, 1.5], the safe braking distance is 1 m, and in this case, the area of the detection region is 0.9 m*1 m=0.9 $m^2$;
in a case where the speed threshold interval is (1.5, 2.0], the safe braking distance is 1.8 m, and in this case, the area of the detection region is 0.9 m*1.8 m=1.62 $m^2$.

In the case where the shape of the detection region is trapezoidal and an upper bottom is preset to be 0.1 m less than the lower bottom, the area of the detection region corresponding to the five speed threshold intervals is as follows:
in a case where the speed threshold interval is (0, 0.25], the safe braking distance is 0.1 m, and in this case, the area of the detection region is (0.9 m+0.8 m)/2*0.1 m=0.085 $m^2$;
in a case where the speed threshold interval is (0.25, 0.5], the safe braking distance is 0.2 m, and in this case, the area of the detection region is (0.9 m+0.8 m)/2*0.2 m=0.17 $m^2$;
in a case where the speed threshold interval is (0.5, 1.0], the safe braking distance is 0.5 m, and in this case, the area of the detection region is (0.9 m+0.8 m)/2*0.5 m=0.425 $m^2$;
in a case where the speed threshold interval is (1.0, 1.5], the safe braking distance is 1 m, and in this case, the area of the detection region is (0.9 m+0.8 m)/2 m*1 m=0.85 $m^2$;
in a case where the speed threshold interval is (1.5, 2.0], the safe braking distance is 1.8 m, and in this case, the area of the detection region is (0.9 m+0.8 m)/2*1.8 m=1.53 $m^2$.

In this embodiment, by providing the detection region with different area sizes, the obstacle avoidance accuracy can be improved. Moreover, the range of the detection region is changed according to the speed in combination with the braking distance of the warehousing robot 2, which can avoid an obstacle avoidance failure due to an excessive speed, and further improve the obstacle avoidance accuracy of the warehousing robot 2.

The beneficial effects of the embodiments of the present disclosure are that: in the obstacle avoidance method provided by the embodiments, the working state information is obtained; the detection region is determined according to the working state information, where the working state information includes the working mode and the working region; and if the obstacle exists in the detection region, the braking is performed. In the embodiments of the present disclosure, different manners are provided to determine the detection region according to different working regions and/or different working modes of the warehousing robot, and when the obstacle exists in the detection region, the braking is performed, so as to improve the success rate of obstacle avoidance with the relatively low operation cost.

Figure 4:
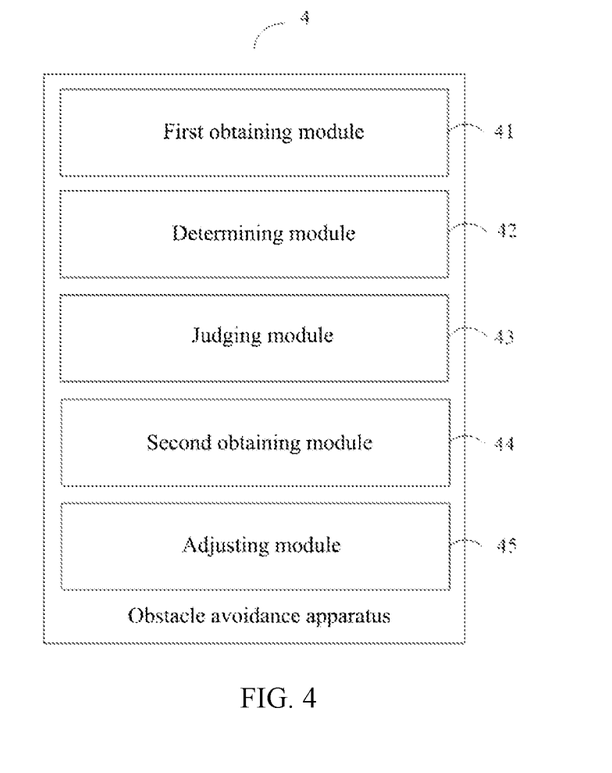
FIG. 4 is a schematic structural diagram of an obstacle avoidance apparatus in accordance with an embodiment of the present disclosure.

An embodiment of the present disclosure further provides an obstacle avoidance apparatus. FIG. 4 is a schematic structural diagram of an obstacle avoidance apparatus in accordance with an embodiment of the present disclosure. As shown in FIG. 4, the obstacle avoidance apparatus 4 includes:
- a first obtaining module 41, configured to obtain working state information;
- a determining module 42, configured to determine a detection region according to the working state information; and
- a judging module 43, configured to perform braking if an obstacle exists in the detection region.

Figure 5:
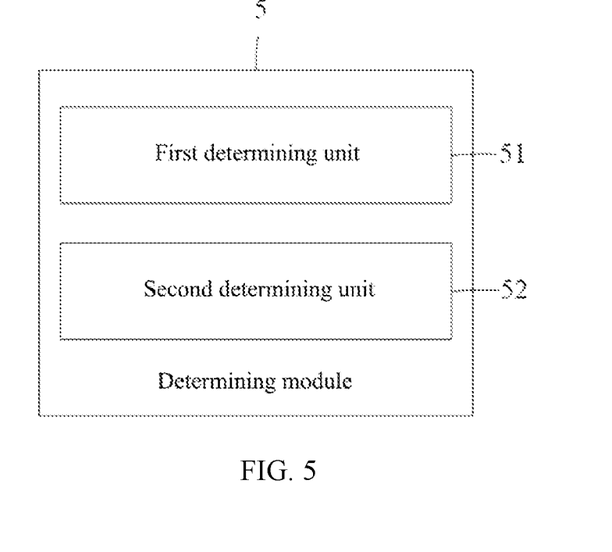
FIG. 5 is a schematic structural diagram of an obstacle avoidance apparatus in accordance with an embodiment of the present disclosure.

The determining module 42 in FIG. 4 may be implemented by the determining module 5 in FIG. 5. Specifically, as shown in FIG. 5, the determining module 5 includes:
- a first determining unit 51, configured to determine the detection region according to a working mode.

The first determining unit 51 is specifically configured to:
- in a case where the working mode is a linear mode, determine the detection region to be quadrangular;
- in a case where the working mode is a rotation mode, determine the detection region to be circular.

Specifically, the determining module 5 includes:
- a second determining unit 52, configured to determine the detection region according to the working mode and a working region.

The second determining unit 52 is specifically configured to:
- in a case where the working mode is the linear mode and the working region is a second region, determine the detection region to be trapezoidal.

Figure 6:
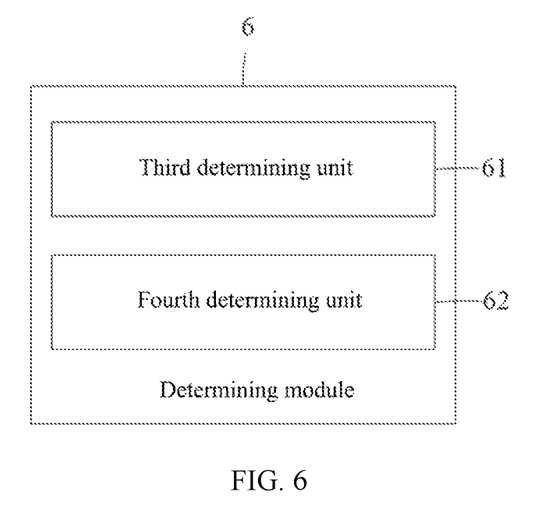
FIG. 6 is a schematic structural diagram of an obstacle avoidance apparatus in accordance with an embodiment of the present disclosure.

Specifically, the determining module 6 includes:
- a third determining unit 61, configured to determine the detection region according to the working region.

Specifically, the third determining unit 61 is specifically configured to:
- in a case where the working region is the second region, determine the detection region to be quadrangular; or, in the case where the working region is the second region, determine the detection region to be trapezoidal;
- in a case where the working region is a first region, determine the detection region to be quadrangular or circular.

Specifically, the determining module 6 includes:
- a fourth determining unit 62, configured to determine the detection region according to the working region and the working mode.

The fourth determining unit 62 is specifically configured to:
- in a case where the working region is the second region and the working mode is the linear mode, determine the detection region to be trapezoidal;
- in a case where the working region is the first region and the working mode is the linear mode, determine the detection region to be quadrangular;
- in a case where the working region is the first region and the working mode is the rotation mode, determine the detection region to be circular.

Specifically, the apparatus further includes:
- a second obtaining module 44, configured to obtain a current running speed;
- an adjusting module 45, configured to adjust a range of the detection region dynamically according to the current running speed and a preset speed threshold interval, the range of the detection region corresponding to the speed threshold interval.

Using the obstacle avoidance apparatus provided by this embodiment, the working state information is obtained; the detection region is determined according to the working state information, where the working state information includes the working mode and the working region; and if the obstacle exists in the detection region, the braking is performed. In the embodiment of the present disclosure, different manners are provided to determine the detection region according to different working regions and/or different working modes of the warehousing robot, and when the obstacle exists in the detection region, the braking is performed, so as to improve the success rate of obstacle avoidance with the relatively low operation cost.

It should be noted that, since the obstacle avoidance apparatus and the obstacle avoidance method applied to a client terminal device in the above method embodiments are based on the same inventive concept, the corresponding content and beneficial effects in the above method embodiments are also applicable to this apparatus embodiment, and will not be described in detail here.

Figure 7:
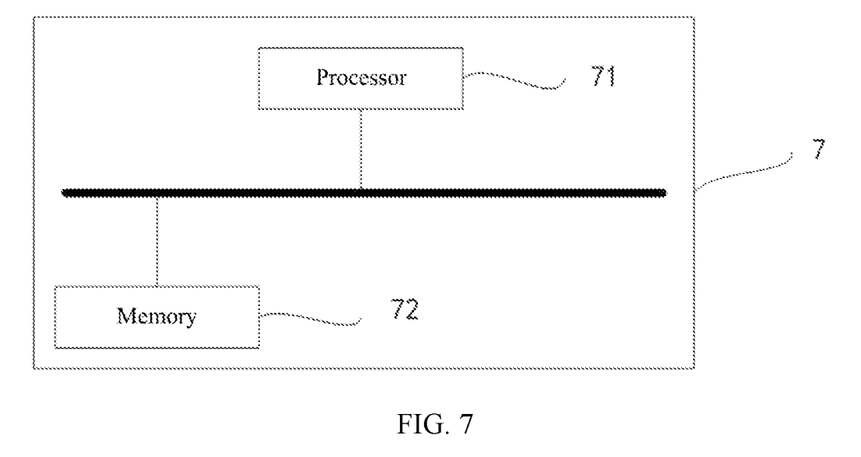
FIG. 7 is a schematic structural diagram of a warehousing robot in accordance with an embodiment of the present disclosure.

An embodiment of the present disclosure further provides a warehousing robot. FIG. 7 is a schematic diagram showing a hardware structure of a warehousing robot in accordance with an embodiment of the present disclosure. As shown in FIG. 7, the warehousing robot includes:
- at least one processor 71; and
- a memory 72 communicatively connected to the at least one processor 71; where,
- the memory 72 stores instructions that are executable by the at least one processor 71, and the instructions are executed by the at least one processor 71 to enable the at least one processor 71 to execute the above obstacle avoidance method.

Specifically, one processor 71 in FIG. 7 is taken as an example. The processor 71 and the memory 72 may be connected through a bus or in other ways, and in FIG. 7, a connection through the bus is taken as an example.

As a non-volatile computer-readable storage medium, the memory 72 may be used to store non-volatile software programs, non-volatile computer-executable programs, and modules, such as program instructions/modules corresponding to the obstacle avoidance method in the embodiments of the present disclosure (e.g., the steps S210 to S230 shown in FIG. 2). The processor 71 executes various functional applications and data processing of the warehousing robot by running the non-volatile software programs, the instructions, and the modules stored in the memory 72, i.e., implements the obstacle avoidance method in the foregoing method embodiments.

The memory 72 may include a program storage area and a data storage area. The program storage area may store an operating system and an application program required for at least one function. The data storage area may store data created according to the use of the warehousing robot. In addition, the memory 72 may include a high-speed random access memory, and may further include a non-volatile memory, such as at least one magnetic disk storage device, a flash memory device, or other non-volatile solid-state storage devices. In some embodiments, the memory 72 may optionally include memories remotely arranged relative to the processor 71, and these remote memories may be connected to the warehousing robot via a network. Examples of the network include, but are not limited to, the Internet, an intranet, a local region network, a mobile communication network, and combinations thereof.

One or more modules are stored in the memory 72, and when executed by the one or more processors 71, the one or more modules execute the obstacle avoidance method in any one of the above method embodiments, for example, execute the method steps S210 to S230 in FIG. 2 described above, the method steps S310 to S320 in FIG. 3 described above; realize the functions of the modules 41 to 45 in FIG. 4, the functions of the modules 51 to 52 in FIG. 5, the functions of the modules 61 to 62 in FIG. 6.

The above product can execute the methods provided by the embodiments of the present disclosure, and have corresponding functional modules for executing the methods and beneficial effects. For technical details not described in detail in this embodiment, the methods provided by the embodiments of the present disclosure may be referred to.

Using the warehousing robot provided by this embodiment, the working state information is obtained; the detection region is determined according to the working state information, where the working state information includes the working mode and the working region; and if the obstacle exists in the detection region, the braking is performed. In the embodiment of the present disclosure, different manners are provided to determine the detection region according to different working regions and/or different working modes of the warehousing robot, and when the obstacle exists in the detection region, the braking is performed, so as to improve the success rate of obstacle avoidance with the relatively low operation cost.

Through the description of the above embodiments, a person of ordinary skill in the art may clearly understand that the embodiments may be implemented by means of software and a general hardware platform, and of course, may also be implemented by hardware. A person of ordinary skill in the art may understand that all or part of the processes of the methods in the embodiments may be implemented by computer program instructions and relevant hardware. The programs may be stored in a computer-readable storage medium. When executing the programs, the processes in the embodiments of the methods may be included. The storage medium may be a magnetic disk, an optical disc, a read-only memory (ROM), or a random access memory (RAM), etc.

Figure 8:
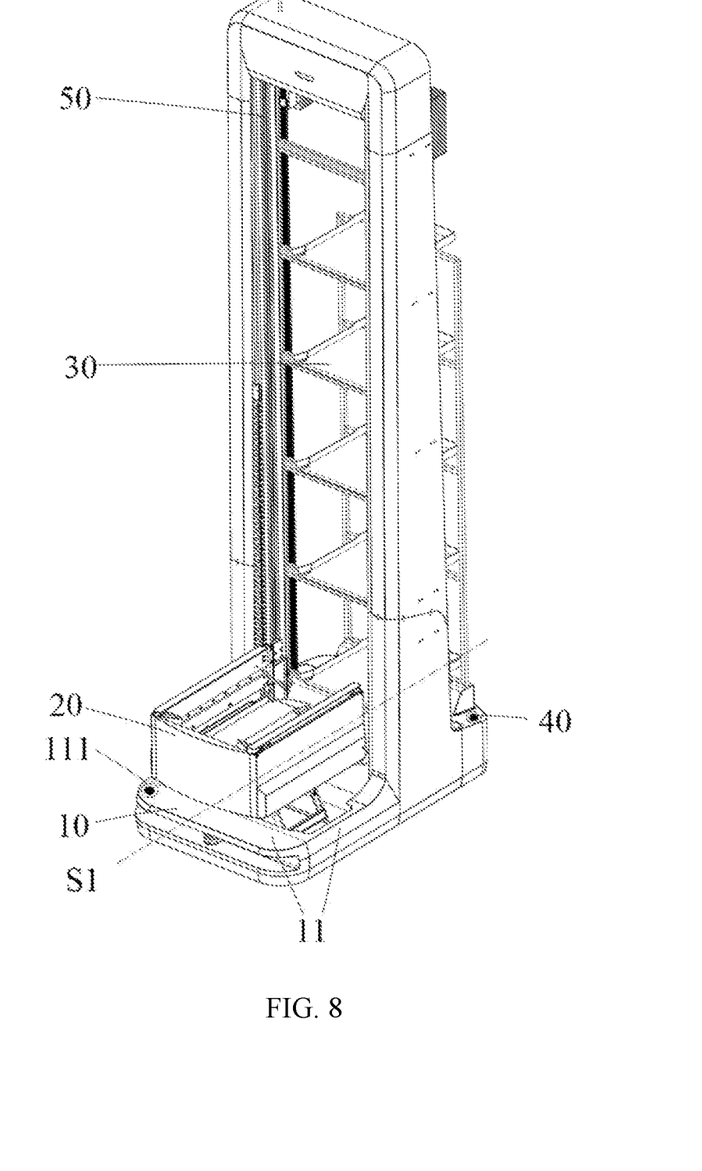
FIG. 8 is a schematic structural diagram of a warehousing robot in accordance with an embodiment of the present disclosure.

As shown in FIG. 8, an embodiment of the present disclosure provides a warehousing robot. The warehousing robot includes: a mobile base 10 used to drive the warehousing robot to move; a storage device 30 installed on the mobile base 10 and used to place materials; a handling device 20 installed on the storage device 30 and used to load materials into the storage device 30 or unload materials from the storage device 30; an obstacle avoidance module 40 installed on the warehousing robot and used to realize an obstacle avoidance function of the warehousing robot.

Specifically, the obstacle avoidance module 40 may be installed at any position of the warehousing robot, and may be self-defined and provided according to a user's needs, which is subject to the realization of the obstacle avoidance function without obstructing the normal operation of the warehousing robot. For example, the obstacle avoidance module 40 is installed on the mobile base 10 or the storage device 20.

Specifically, the mobile base 10 is provided with driving wheels and driven wheels. The driving wheels and the driven wheels are cooperatively used to drive the mobile base 10 to move, thereby driving the entire warehousing robot to move, so that the warehousing robot is able to move autonomously, so as to realize intelligent loading and unloading of materials.

Optionally, the number of the driving wheels is two, and the driving wheels are installed on a side of the mobile base 10 close to the ground. The mobile base 10 has a symmetry axis S1, one of the driving wheels is disposed at a side of the symmetry axis S1, and another driving wheel is disposed on another side of the symmetry axis S1. The number of the driven wheels is four, and the driven wheels are distributed around the driving wheels in a rectangular shape. When rotation speeds of the two driving wheels at left and right are controlled to be different, the warehousing robot is able to be driven to rotate.

Optionally, the warehousing robot further includes a lift component 50 disposed on the mobile base 10. Both the storage device 30 and the handling device 20 are installed on the lift component 50.

Further, the storage device 30 may be a multi-layer storage device installed on the lift component 50. The handling device 20 can move along a vertical direction of the lift component 50 for loading the materials into the multi-layer storage device or unloading the materials from the multi-layer storage device.

Specifically, the obstacle avoidance module 40 may be installed on any surface of the mobile base 10 of the warehousing robot, which is subject to the realization that the detection region is able to be established at a predetermined position when the warehousing robot performs a linear motion or a rotation motion.

Further, an installation manner of the obstacle avoidance module 40 may be fixed installation or liftable installation.

Specifically, the mobile base 10 includes a controller (not shown in the figures) which is connected to the obstacle avoidance module 40 and used to drive the warehousing robot to perform the linear or rotation motion according to information sent by a background server. The controller may be embedded in the mobile base 10.

Further, the controller receives the information sent by the background server to drive the driving wheels to perform the linear or rotation motion, thereby driving the warehousing robot to perform the linear or rotation motion.

Specifically, the obstacle avoidance module 40 is installed on the mobile base 10. Further, the obstacle avoidance module 40 may be fixedly installed on the mobile base, or may be telescopically installed on the mobile base 10 through a driving device.

Specifically, the mobile base 10 has the symmetry axis S1, and at least one obstacle avoidance module 40 is disposed on either side of the symmetry axis S1. An extension direction of the symmetry axis S1 is parallel to a forward direction of the warehousing robot. The obstacle avoidance modules 40 are respectively disposed on the two sides of the symmetry axis S1, which can realize the establishment of the detection region covering the surroundings of the warehousing robot, so that the warehousing robot is able to detect surrounding obstacles when the warehousing robot is performing the rotation motion, thereby avoiding economic losses caused by unnecessary collisions with the obstacles.

Preferably, the obstacle avoidance module 40 is disposed in an edge region of the mobile base 10 away from the symmetry axis S1, so that different forms of detection regions can be established more conveniently.

Specifically, a front end of the mobile base 10 includes at least one obstacle avoidance module 40, and a rear end of the mobile base 10 includes at least one obstacle avoidance module 40, where an orientation of the front end is the same as the forward direction of the warehousing robot. The obstacle avoidance modules 40 are respectively located on the two sides of the symmetry axis S1 of the mobile base 10, and are located at the front and rear ends of the base 10, which can make the establishment and switching of the detection region more convenient.

Preferably, the mobile base 10 is a rectangular mobile base, and the obstacle avoidance modules 40 are disposed at diagonal corners of the rectangular mobile base, respectively.

Specifically, the mobile base 10 includes a housing 11. The housing 11 is provided with through hole(s) 111 at position(s) corresponding to the obstacle avoidance module(s) 40. The obstacle avoidance module 40 can move along the through hole 111. The controller can drive the obstacle avoidance module 40 to extend outward or retract inward along the through hole 111, so as to reduce the probability of the obstacle avoidance module 40 being damaged by the outside when the obstacle avoidance module 40 is in a non-working state.

It should be noted that the mobile base 10 further includes a driver connected to the controller. The driver is used to drive the obstacle avoidance module 40 to move along the through hole 111. The driver is embedded in the mobile base 10.

Optionally, the through hole 111 may be disposed on any surface of the mobile base 10 except the surface close to the ground. It should be noted that the position of the through hole 111, i.e., the position of the obstacle avoidance module 40, is not limited to one surface of the mobile base 10. The through hole 111 may be disposed on any one of other five surfaces other than the surface close to the ground, as long as it is ensured that after the obstacle avoidance module 40 extends out of the through hole 111, there is a sufficient angle to establish different forms of detection regions.

Specifically, the mobile base 10 further includes a speed measuring device which is connected to the controller and used for obtaining the running speed of the warehousing robot. Preferably, the speed measuring device may be an encoder, and the mobile base 10 further includes a motor which is connected to the controller and used for driving the driving wheels to work. The encoder is installed on the motor for obtaining a rotation speed of a rotation shaft of the motor, so that the controller obtains the running speed of the warehousing robot through the rotation speed of the rotation shaft.

Specifically, the warehousing robot further includes a positioning device which is connected to the controller and used for collecting position information of the warehousing robot. The positioning device may be a camera connected to the controller. The controller uploads the position information collected by the positioning device to the background server through a communication module.

Specifically, the obstacle avoidance module 40 is one or any combination of a photoelectric sensor, a magnetic sensor, a vision sensor, an ultrasonic sensor, and a gravity sensor. The type of the obstacle avoidance module 40 may be selected according to different application scenarios.

Preferably, the obstacle avoidance module 40 is a lidar.

Specifically, the warehousing robot further includes a detection region established by the obstacle avoidance module, and a shape of the detection region includes a rectangle, a trapezoid, or a circle.

It should be noted that the controller can set up the detection region of different shapes according to different working regions and/or working modes (the working mode include the linear motion and the rotation motion), and the detection region is established in the moving direction of the warehousing robot.

An embodiment of the present disclosure provides a non-volatile computer-readable storage medium. The computer-readable storage medium stores computer-executable instructions that are executed by one or more processors, such as the above processor(s), so that the above one or more processors may execute the obstacle avoidance method in any one of the above method embodiments, for example, execute the method steps S210 to S230 in FIG. 2 described above, the method steps S310 to S320 in FIG. 3 described above; realize the functions of the modules 41 to 45 in FIG. 4, the functions of the modules 51 to 52 in FIG. 5, the functions of the modules 61 to 62 in FIG. 6.

The apparatus embodiments described above are merely illustrative. The units described as separate components may or may not be physically separated, and the components displayed as the units may or may not be physical units, that is, may be located in one place, or may be distributed to a plurality of network units. Some or all of the modules may be selected according to actual needs to achieve the objectives of the solutions in the embodiments.

The above products can execute the methods provided by the embodiments of the present disclosure, and have corresponding functional modules for executing the methods and beneficial effects. For technical details not described in detail in this embodiment, the methods provided by the embodiments of the present disclosure may be referred to.

Finally, it should be noted that the above embodiments are only used to describe the technical solutions of the present disclosure, not to limit them. Under the concept of the present disclosure, in the above embodiments or different embodiments, the technical features may also be combined, the steps may be implemented in any order, and there are many other variations in different aspects of the present disclosure as described above, which are not provided in detail for the sake of brevity. Although the present disclosure has been described in detail with reference to the foregoing embodiments, a person of ordinary skill in the art will understand that the technical solutions recorded in the foregoing embodiments still may be modified, or some of the technical features may be equivalently replaced. These modifications or replacements do not make the essence of the corresponding technical solutions deviate from the scope of the technical solutions in the embodiments of the present disclosure.

What is claimed is:

1. An obstacle avoidance method applied to a warehousing robot, wherein the method comprises:
obtaining working state information;
determining a detection region according to the working state information; and
performing braking if an obstacle exists in the detection region;
wherein the working state information comprises a working mode;
wherein the determining the detection region according to the working state information comprises:
determining the detection region according to the working mode;
wherein the determining the detection region according to the working mode comprises:
in a case where the working mode is a linear mode, determining the detection region to be quadrangular;
in a case where the working mode is a rotation mode, determining the detection region to be circular.

2. The obstacle avoidance method according to claim 1, wherein:
the working state information further comprises a working region;
the determining the detection region according to the working state information comprises:
determining the detection region according to the working mode and the working region.

3. The obstacle avoidance method according to claim 2, wherein:
the determining the detection region according to the working mode and the working region comprises:
in a case where the working mode is the linear mode and the working region is a second region, determining the detection region to be trapezoidal;
in a case where the working mode is the linear mode and the working region is a first region, determining the detection region to be rectangular.

4. The obstacle avoidance method according to claim 1, wherein:
the working state information comprises a working region;
the determining the detection region according to the working state information comprises:
determining the detection region according to the working region.

5. The obstacle avoidance method according to claim 4, wherein:
the determining the detection region according to the working region comprises:
in a case where the working region is a second region, determining the detection region to be quadrangular;
in a case where the working region is a first region, determining the detection region to be quadrangular or circular.

6. The obstacle avoidance method according to claim 5, wherein:
the working state information further comprises a working mode;
the determining the detection region according to the working state information comprises:
determining the detection region according to the working region and the working mode.

7. The obstacle avoidance method according to claim 6, wherein:
the determining the detection region according to the working region and the working mode comprises:
in a case where the working region is the second region and the working mode is a linear mode, determining the detection region to be trapezoidal;
in a case where the working region is the first region and the working mode is the linear mode, determining the detection region to be quadrangular;
in a case where the working region is the first region and the working mode is a rotation mode, determining the detection region to be circular.

8. The obstacle avoidance method according to claim 4, wherein:
the determining the detection region according to the working region comprises:
in a case where the working region is a second region, determining the detection region to be trapezoidal.

9. The obstacle avoidance method according to claim 1, wherein after determining the detection region according to the working state information and before performing the braking if the obstacle exists in the detection region, the method further comprises:
obtaining a current running speed;
adjusting a range of the detection region dynamically according to the current running speed and a preset speed threshold interval, the range of the detection region corresponding to the speed threshold interval.

10. A warehousing robot, wherein the warehousing robot comprises:
at least one processor; and
a memory communicatively connected to the at least one processor; wherein,
the memory stores instructions that are executable by the at least one processor, and the instructions are executed by the at least one processor to enable the at least one processor to:
obtain working state information;
determine a detection region according to the working state information; and
perform braking if an obstacle exists in the detection region;
wherein the working state information comprises a working mode;
wherein the at least one processor is further enabled to:
determine the detection region according to the working mode;
wherein the at least one processor is further enabled to:
in a case where the working mode is a linear mode, determine the detection region to be quadrangular;
in a case where the working mode is a rotation mode, determine the detection region to be circular.

11. The warehousing robot according to claim 8, wherein the working state information further comprises a working region;
the at least one processor is further enabled to:
determine the detection region according to the working mode and the working region;
the at least one processor is specifically enabled to:
in a case where the working mode is the linear mode and the working region is a second region, determine the detection region to be trapezoidal;
in a case where the working mode is the linear mode and the working region is a first region, determine the detection region to be rectangular.

12. The warehousing robot according to claim 10, wherein the working state information comprises a working region;
the at least one processor is further enabled to:
determine the detection region according to a working region.

13. The warehousing robot according to claim 12, wherein the at least one processor is further enabled to:
in a case where the working region is a second region, determine the detection region to be quadrangular; or in the case where the working region is the second region, determine the detection region to be trapezoidal;
in a case where the working region is a first region, determine the detection region to be quadrangular or circular.

14. The warehousing robot according to claim 13, wherein the working state information further comprises a working mode;
the at least one processor is further enabled to:
determine the detection region according to the working region and the working mode;
the at least one processor is specifically enabled to:
in a case where the working region is the second region and the working mode is a linear mode, determine the detection region to be trapezoidal;

in a case where the working region is the first region and the working mode is the linear mode, determine the detection region to be quadrangular;

in a case where the working region is the first region and the working mode is a rotation mode, determine the detection region to be circular.

15. The warehousing robot according to claim 12, wherein the at least one processor is further enabled to:

in a case where the working region is a second region, determine the detection region to be trapezoidal.

16. The warehousing robot according to claim 10, wherein the at least one processor is further enabled to:

obtain a current running speed;

adjust a range of the detection region dynamically according to the current running speed and a preset speed threshold interval, the range of the detection region corresponding to the speed threshold interval.

* * * * *